L. LITTLEJOHN.
Bung-Bush Inserters.
No. 138,568. Patented May 6, 1873.
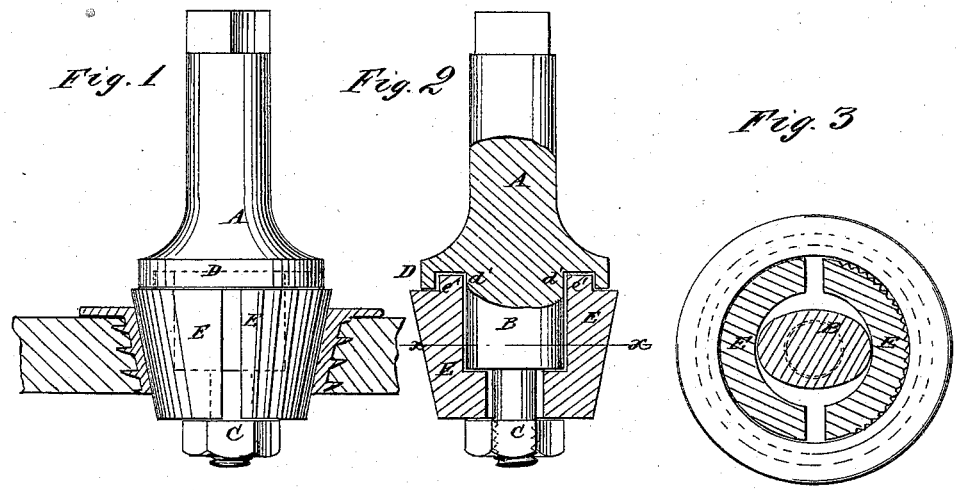
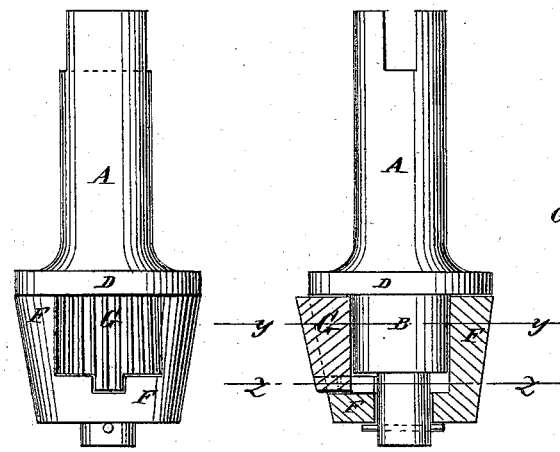
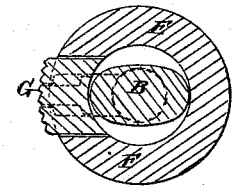
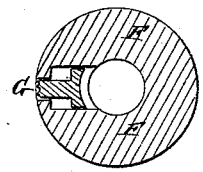
Witnesses:
Inventor:
L. Littlejohn
Per Attorneys.

UNITED STATES PATENT OFFICE.

LOMAX LITTLEJOHN, OF NEW YORK, N. Y.

IMPROVEMENT IN BUNG-BUSH INSERTERS.

Specification forming part of Letters Patent No. 138,568, dated May 6, 1873; application filed April 5, 1873.

*To all whom it may concern:*

Be it known that I, LOMAX LITTLEJOHN, of the city, county, and State of New York, have invented a new and useful Improvement in Bung-Bush Inserter, of which the following is a specification:

Figure 1 is a side view of my improved device, and showing a bung-bush in section. Fig. 2 is a detail longitudinal section of the device. Fig. 3 is a detail cross-section of the same, taken through the line $x\,x$, Fig. 2. Fig. 4 is a side view of a modified form of the same. Fig. 5 is a detail sectional view of the same. Fig. 6 is a detail sectional view of the same, taken through the line $y\,y$, Fig. 5. Fig. 7 is a detail sectional view of the same, taken through the line $z\,z$, Fig. 5.

Similar letters of reference indicate corresponding parts.

My invention has for its object to furnish a simple, convenient, and effective instrument for inserting metallic bung-bushes in barrels and other casks.

The invention consists in the combination of the elliptical journal, formed upon the end of a shank, with the split sleeve, made with an elliptical or elongated cavity, as hereinafter fully described.

A represents the shank of the tool, the upper end of which is so formed as to receive a wrench for operating it. Upon the lower end of the shank A is formed an elliptical journal, B, having a screw-thread cut upon its end to receive a nut, C. Upon the shank A, at the upper end of the journal B, is formed a collar, D, around which is formed a ring-groove, $d'$, concentric with the axis of the shank A, to receive the ring flange or tongue $e'$, formed upon the end of the split sleeve E. The tongue $e'$ of the split sleeve E is made narrower than the groove $d'$ of the collar D, so that the said sleeve may be expanded. The cavity of the split sleeve E is made elliptical or elongated, the longer axis being in the direction of the plane of division, so that when the elliptical journal B is turned, bringing its longer axis in line with the plane of division of the sleeve E, the edges of the halves of the sleeve may come in contact with each other. The outer surface of the sleeve E is made of the same taper as the bung-bush, so that it may fit into said bush. The outer surface of the sleeve E may be made plain, or it may be toothed or roughened to cause it to take a firm hold upon the bush. By this construction, when the sleeve E has been inserted in the bush and the shank A turned, the elliptical journal B will expand the sleeve E, causing it to grasp the bush firmly and screw it into the bung-hole in the stave.

If desired, instead of the split sleeve E the sleeve F may be used, which has a circular hole formed through it equal in diameter to the longer axis of the elliptical journal.

In one side of the sleeve F is formed an opening, in which is placed a block, G, which has a T-tongue formed upon one end, which enters a T-groove in the adjacent part of the sleeve F to prevent the said block from dropping out. The block G is made thicker than the wall of the sleeve F, so that when the elliptical journal is turned with its longer axis parallel with the block G, the said block may be pushed in, bringing its outer surface flush with the outer surface of the sleeve F, allowing said sleeve to be inserted in the bung-bush. In this case, when the shank A is turned the block G will be forced outward, causing the instrument to carry the bush with it in its revolution.

Having thus described my invention, I claim as new and desire to secure by Letters Patent—

The combination of the elliptical journal B, formed upon the end of a shank, A, with the split sleeve E, made with an elliptical or elongated cavity, substantially as herein shown and described, and for the purpose set forth.

LOMAX LITTLEJOHN.

Witnesses:
JAMES T. GRAHAM,
T. B. MOSHER.